Figures 1, 2:
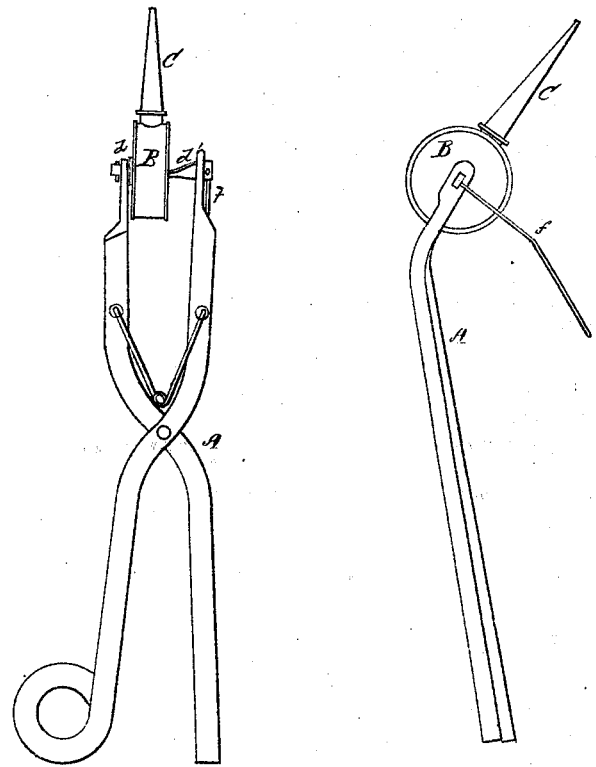

G. W. CROSSLEY.

Oil Can.

No. 122,995.   Patented Jan. 23, 1872.

WITNESS.   INVENTOR.

122,995

UNITED STATES PATENT OFFICE.

GABRIEL W. CROSSLEY, OF CLEVELAND, OHIO.

IMPROVEMENT IN PORTABLE OILERS.

Specification forming part of Letters Patent No. 122,995, dated January 23, 1872.

SPECIFICATION.

I, GABRIEL W. CROSSLEY, of Cleveland, in the county of Cuyahoga and State of Ohio, have invented a new and Improved Oil-Can for oiling overhead journals, of which the following is a specification:

This invention relates to the combination of an oiler with a pair of tongs in such a manner that by compressing the tongs the oiler shall be turned so as to bring the spout downward and thus compress the oiler so as to force the oil out through the spout. When the tongs are again expanded the oiler will again turn with its spout upward.

In the drawing, Figure 1 is a side view of the tongs and oiler. Fig. 2 is a transverse view of the same.

A A represents a pair of tongs, which may be made of iron in the usual form, the handles being sufficiently long to enable a person to reach journal-boxes or bearings overhead without the necessity of employing a step-ladder. Between the jaws of the tongs is arranged a circular oiler, B, having a spout, C. To the center of the flat sides of the oiler I attach journals $d$ $d'$. The journal $d'$ I make flat, and give it a quarter-turn twist, which, playing in a slot in the jaw of the tongs, gives the oiler a quarter turn, when they are compressed, which brings the spout around and pointing downward, the opposite journal turning in the opposite jaw. When the jaws of the tongs have been compressed to meet the sides of the oiler, by compressing them still more the oil will be forced out. When the pressure on the tongs is released they expand, and the oiler is turned with its spout upward again, a spring, $e$, situated between the jaws forcing them open. A spring is also put inside the oiler to insure the expansion of its sides. A wire pin or point, $f$, attached to the journal $d'$ is provided for the purpose of picking out the hole in the journal-box before oiling, which, when the tongs are compressed, turns around out of the way.

I claim—

The combination of the oiler B with the tongs A, substantially as shown and described, and for the purpose set forth.

G. W. CROSSLEY.

Witnesses:
   GEO. W. TIBBITTS,
   GEO. HESTER.